United States Patent [19]

Legey

[11] 4,109,285

[45] Aug. 22, 1978

[54] TAPE MACHINE AND SLIDE PROJECTOR SYNCHRONIZING DEVICE

[76] Inventor: Elso Jose Figueira Legey, 1501 Mower Ct., Wauwatosa, Wis. 53213

[21] Appl. No.: 777,385

[22] Filed: Mar. 14, 1977

[51] Int. Cl.² .......................................... G11B 27/22
[52] U.S. Cl. .................................................. 360/80
[58] Field of Search .................... 360/80, 79, 27, 31, 360/74; 353/15

[56] References Cited

U.S. PATENT DOCUMENTS

| | | | |
|---|---|---|---|
| 3,026,769 | 3/1962 | Thiele et al. | 360/80 X |
| 3,276,315 | 10/1966 | Chalfin | 353/15 |
| 3,420,966 | 1/1969 | Wright | 353/15 X |
| 3,591,734 | 7/1971 | Abbott | 360/80 X |
| 3,839,733 | 10/1974 | Schechter | 360/80 |
| 3,841,744 | 10/1974 | Rubin | 353/15 |

Primary Examiner—John H. Wolff
Attorney, Agent, or Firm—Ralph G. Hohenfeldt

[57] ABSTRACT

A device for actuating the change mechanism of a slide projector in synchronizm with an audio tape recorder and player comprises a tone decoder including a voltage controlled oscillator in a phase-locked loop associated with a frequency comparator. The oscillator produces slide change signals constituted by square wave pulses in the audio frequency range. The signals are recorded on the tape where slide changes are desired by operating a momentary switch which couples the signals to the recorder through its microphone jack. During playback, the audio signal is fed through a tuned operational amplifier to the tone decoder which responds to the presence of a signal component that compares in frequency with that of the oscillator by performing a switching function which may be used to activate the slide changer of the projector.

13 Claims, 1 Drawing Figure

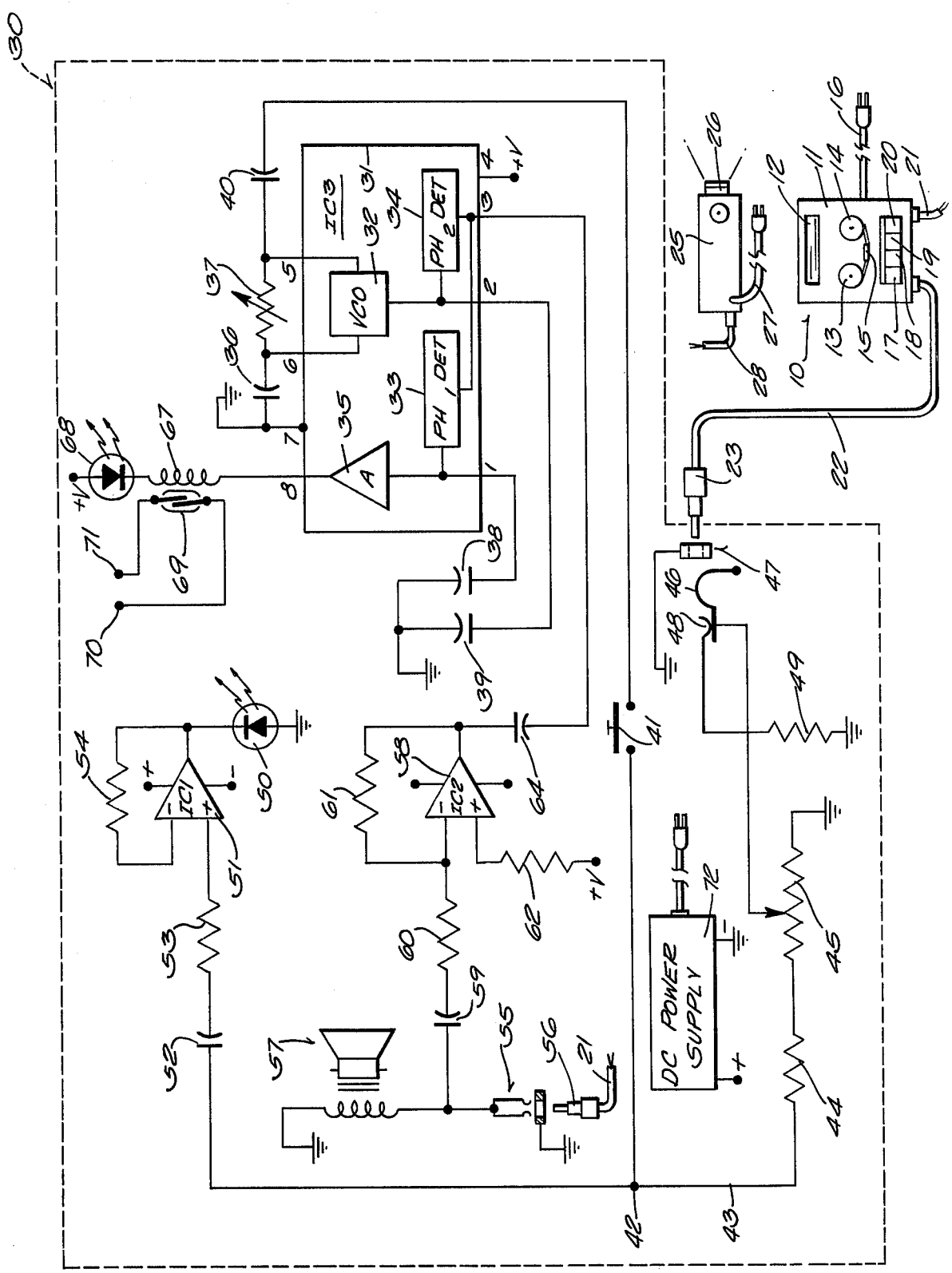

TAPE MACHINE AND SLIDE PROJECTOR SYNCHRONIZING DEVICE

BACKGROUND OF THE INVENTION

This invention relates to apparatus for use with an intermittently operable slide projector or other still picture projector and with an audio tape recorder-reproducer to facilitate changing of the picture at desired times when a tape is being played.

Apparatus of this general type is known and normally comprises means for recording on magnetic tape a suitable picture change signal either on the same channel or on a separate channel from that used for the audio recording. During playback of the tape, the change signal is detected and processed for producing a signal that is used to effect a slide changing operation by the projector. A nonexclusive listing of prior patents which show apparatus of this type includes U.S. Pat. Nos. 2,811,588, 3,276,315, 3,342,103, 3,402,966 and 3,612,675.

SUMMARY OF THE INVENTION

An object of the present invention is to provide a compactly packaged unitary apparatus for recording picture change signals on an audio tape and for detecting such signals to produce a control signal for operating a slide projector or other picture projector.

Another object is to provide apparatus of the foregoing type which is adaptable for use with almost any type of audio tape recorder-reproducer and which requires no electrical connection to the tape machine nor to the picture projector except connections which can be made very quickly and conveniently with jacks. An adjunct of this object is that neither the audio tape machine nor the projector needs to be modified in order to use the new apparatus with them.

A still further object is to provide change signal fixing and detecting apparatus which is distinguished by the absence of movable parts which would be subject to breakdown and by the absence of the usual multiplicity of relays except for a single relay and switch which is used to control the projector.

Still another object is to provide a picture changing device which uses only a small number of readily available electronic components and which facilitates maintenance and repair by enabling the owner to simply unplug the components from sockets and replace them with others without requiring the owner to have any skill in electronics.

Yet another object is to provide apparatus which records and responds to very low level and unobtrusive change signals and which is very stable, insensitive to temperature variations, consumes little power and is not subject to erroneous operation by electronic noise.

Still another object is to provide apparatus, which in its most sophisticated form, can cause a slide projector to insert the next slide in a sequence or selectively to step backward to a preceding slide.

A further object is to provide apparatus which permits superimposing the slide change signals on the same track in which the audio information is recorded on an existing tape without suffering significant loss of information.

Briefly, the new apparatus comprises a small box which has jacks for coupling to the earphone and microphone jacks of a tape recorder-reproducer which shall hereinafter be called a recorder for the sake of brevity. There are also output terminals for coupling control signals from the apparatus to a picture projector. The box contains a tone decoder which produces square wave output pulses in the audio frequency range which are applied to the audio tape through a foot or hand operated switch. During playback, the recorded change signals are supplied to phase detector means in the decoder which performs a comparison of the recorded signals and oscillator signals. If the frequency of the detected recorded signal is the same as the frequency and phase of the output signal of the oscillator in the decoder, a transistor switch becomes grounded so it will sink current. The transistor switch completes a circuit from a supply terminal through the relay coil of a magnetic reed switch which controls the slide change mechanism of the projector.

How the foregoing and other more specific objects of the invention are achieved and other important aspects of the invention will now be discussed in greater detail in reference to the drawing.

DESCRIPTION OF THE DRAWING

The drawing is a schematic diagram of the new slide changer signal fixing and sensing apparatus together with a symbolic showing of a typical slide projector and a typical tape recorder which may be used therewith.

DESCRIPTION OF A PREFERRED EMBODIMENT

In the drawing a typical portable tape recorder is generally designated by the reference numeral 10 and comprises a housing 11, a grille 12 behind which there is the usual speaker, a pair of tape reels 13 and 14 which may be in a cassette, a recording and reproducing pickup head 15 and a line cord and plug assembly 16. The recorder also has several switch keys 17-20 which are characteristic of those found on recorders of this type. For instance, keys 17 and 18 may be depressed jointly to effect recording, key 17 may be pressed alone to effect playback without erasing and keys 19 and 20 may be pressed to effect rapid forward advance or reversal of the tape direction. The new apparatus is within dashed-line reactangle 30.

Connected to the recorder 10 by way of its earphone jack is a fragmentarily shown cable 21 which normally connects to an earphone, not shown, but in this case is used to conduct the audio signal including the recorded change signals from the recorder to the new apparatus 30. Another cable 22 has one end connected to the microphone jack of the recorder and its other end terminates in a plug 23. Cable 22 is used to conduct the change signals which are to be recorded on the tape from the new apparatus 30 to the tape recorder 10.

A slide projector 25 is also depicted. It has a lens assembly 26 and a line cord 27 for energizing its electrical components. A cable 28, shown fragmentarily, has one of its ends plugged into the remote control slide changer jack of the projector. The other end of cable 28 connects to the slide change control signal output terminals 70 and 71 of the new control apparatus 30 as will be explained in more detail later.

Attention is now invited to the dashed line 30 which encloses the circuitry of the new change signal producing, detecting and utilizing apparatus. The apparatus comprises an integrated circuit IC3 which is defined by the rectangle marked 31. IC3 is a tone decoder which in an actual embodiment is a type LM567 available from National Semiconductor Corporation but the type 567 tone decoder is available from Fairchild Semiconductor Corporation and other manufacturers too. The main components of IC3 are shown symbolically in rectangle 31 and are seen to comprise a voltage controlled oscillator (VCO) 32, first phase detector 33, second phase detector 34 and a transistor switch circuit 35. The frequency of the VCO is set by the values of an external capacitor 36 which is connected between pins 6 and 7 and an external adjustable resistor 37 connected between pins 5 and 6. Pin 5 is the output pin of the VCO. The VCO provides a pulse train having a highly stable center frequency of 2000 Hz. in an actual embodiment. Although this frequency is considered preferable, the selected frequency could be anywhere between 1500 Hz. and 2500 Hz. In the actual embodiment, the output signals from the VCO are similar to those obtained from a monostable multivibrator. In this example, the pulse duration is 2 microseconds and there are about 498 microseconds between pulses.

The pulsed output signals are selectively coupled from output pin 5 of decoder 31 to the microphone input of recorder 10 through an output circuit which includes a coupling capacitor 40 and a manually operable switch 41 which feeds to a junction point 42. The output circuit further includes a line 43 extending from junction point 42 which has a limiting resistor 44 connected in series with a logarithmic potentiometer 45. One side of the resistor in potentiometer 45 is connected to ground. The arm of potentiometer 45 is directly connected to a spring contact 46 of a jack assembly 47 which is mounted in the box, not shown, containing the components within the dashed line rectangle 30. When the microphone cable plug 23 is not plugged into jack 47, a resistor 49 is also in circuit with potentiometer 45 by reason of a spring contact 48 being engaged with contact 46. Resistor 49 is of such value as to load the change signal output circuit just described with the equivalent impedance of the microphone input of the recorder 10 so that when plug 23 is not inserted in the jack hum or noise will not occur in the apparatus.

Switch 41 is quickly closed and opened to insert the change signals onto the audio track of the tape in recorder 10 at those times when it is desired for the projector to change slides during replay of the tape. Switch 41 may be a manually operated spring return push button switch mounted in the box which contains the other components or it may be a foot operated switch which could also be in the box or on the floor and connected to appropriate terminals in the box with a cord.

A visual indication that the change signals are being recorded is obtained with a light source such as light emitting diode 50 (LED) which turns on when switch 41 is closed. LED 50 is driven by the output of IC1 which is an operational amplifier that is also marked 51. The noninverting input to operational amplifier 51 is coupled to junction point 42 through a coupling capacitor 52 and an input resistor 53. The amplifier also has a feedback resistor 54. The ratio of the feedback resistor value to the input resistor is 1 megohm to 10 kilohms in an actual embodiment so the amplifier has very high gain and loads the VCO very little. In an actual embodiment, operational amplifier 51 is ¼ of a quad type LM 3900 obtainable from National Semiconductor Corporation but equivalent amplifiers are obtainable from other manufacturers under type number 3900. This type of amplifier is characterized by having a high slew rate which means that it responds to small rapid changes in its input by producing a rapid increase in its output so that LED 50 will reach full brilliance even though switch 41 may be closed only for a short time.

During recording of the change signal bursts, plug 23 is, of course, inserted in jack 47. Plug 23 may be removed from the jack or remain in it when the tape is rewound and being played back ater having had the change signals recorded on it. The recorder 10 imposes no load on the apparatus with plug 23 inserted.

For playback, the composite program audio signals and the recorded change signals are fed from the earphone jack of recorder 10 over cable 21 to input jack 55 of the apparatus. A plug 56 on cable 21 is insertable in jack 55. When the plug is inserted, the recorded sounds on the audio track of the tape can be heard with a speaker which is marked 57 and is built into the new apparatus 30. This speaker is required for the well-known reason that in most recorders 10 their built-in speakers are disabled when an earphone jack is plugged in as is the case here when change signal output cable 21 is plugged into the recorder instead of the earphone cable. The magnitude of the recorded change signals is so small that these signals are barely perceptible over the speaker.

During playback concurrently with projection of sequence of slides, the composite audio and change signals are fed back to tone decoder 31 through an operational amplifier IC2 which is also marked 58. This amplifier is another ¼ of the LM 3900 quad and has the same desirable properties as amplifier 51. Amplifier 58 is connected as an inverting amplifier and has an input coupling capacitor 59 serially connected to an input resistor 60 which connects to the inverting input of the amplifier. A feedback resistor 61 is connected between the output and input of amplifier 58 and another resistor 62 of the same value is connected between its noninverting input and positive supply voltage. Operational amplifier 58 has a high constant gain and a high slew rate also. Gain is exemplified by feedback resistor 61 having a value of 10 megohms and input resistor 60 having a value of 10 kilohms in an actual embodiment. The output of this amplifier is essentially zero when its input is low and it switches to a high output upon receiving an input signal. An operational amplifier 58 of the type used herein is very sensitive to low level tones of the type recorded as transfer signals on the tape. The operational amplifier is tuned for peak sensitivity to the transfer signal frequency.

The output signal from operational amplifier 58 is coupled to pin 3 of tone decoder 31 with a capacitor 64 which is a 0.02 microfarad capacitor in an actual embodiment. The pulsed transfer signals recorded on the tape may be distorted to some extent so they have harmonics which are filtered by capacitor 59 and resistor 60 at the input of operational amplifier 58 and are further filtered at the output by capacitor 64. In an actual embodiment, capacitor 59 has a value of 0.02 microfarads and resistor 60 has a value of 10 kilohms.

The center frequency to which the tone decoder 31 is most sensitive is determined by the values of capacitors 38 and 39 which are connected to pins 1 and 2, respectively, of decoder 31. In an actual embodiment, capacitor 38 has a value of 10 microfarads and capacitor 39 has a value of 5 microfarads.

The signal fed to input pin 3 of decoder 31 is phase detected in the decoder. Phase detectors 33 and 34, shown in block form in the decoder, perform the phase detection. If the phase and frequency of the input signal to pin 3 agrees with that of the VCO, transistor switch 35 switches to ground. Transistor switch 35 is connected to pin 8 of decoder 31. Also connected to pin 8 is a series circuit comprising an electromagnet coil 67 and a light source such as LED 68. The cathode of the LED is connected to positive supply. When transistor switch 35 effects a ground, there is conduction through the diode and coil 67. Coil 67 is adjacent a magnetic reed switch 69 which closes when coil 67 is conducting. Switch 69 is in a circuit terminating in output terminals 70 and 71. The conductors of cable 28, which is shown plugged into projector 25, connect to terminals 70 and 71 by means of a jack which is not shown. Momentary closure of switch 69 in response to the apparatus detecting a recorded change signal switches the picture transfer mechanism of the projector 25 which causes a change of slides.

LED 68 flashes on and off to provide a visual indication that switch 69 has been closed to effect a slide change. It is desirable for LED 68 to be a different color than LED 50. For example, LED 50 may be green and LED 68 may be red.

The power supply for the circuitry within the boundaries of dashed line 30 is shown symbolically and is marked 72. This is a single voltage output power supply which preferably uses full wave rectification. An inexpensive single voltage power supply may be used since all of the integrated circuits, IC1–IC3, operate on a single voltage power supply. The power supply voltage is 6.2 volts d-c in an actual embodiment but other voltages could be used since the integrated circuits are tolerant to a voltage range of at least 5 volts to 10 volts.

It is important to note that neither operational amplifier 58 nor the input to tone decoder 31 will respond to a sine wave harmonic which is characteristic of recorded audio signals. This further assures that the tone decoder will only cause the transfer mechanism of the projector to be switched in response to the recorded change signals. Thus, the apparatus is essentially immune to normal audio signals and noise which may be derived from the tape or other source.

As implied earlier, the integrated circuits are installed in plug in sockets, not shown, which makes home repair of the apparatus easy. The integrated circuits are the most likely components to fail but they can be obtained at low price from electronic supply stores. Inexpensive 10% tolerance resistors may be used in the circuit without loss of sensitivity or stability. Small variations in signal level in the circuit have no effect because decoder 31 responds to frequency and phase coincidence rather than input signal magnitude.

It should be appreciated that it is contemplated for higher priced models of the apparatus to duplicate the integrated circuits comprised of IC1–IC3 to allow for recording on the audio tape signals having a different frequency than the transfer signals provided by the circuitry described above. The change signals recorded at the different frequency may be used to cause the projector 25 to step back for the purpose of repeating projection of a slide which has been shown earlier in the sequence. The basic apparatus described above, however, meets the requirements of simplicity and low cost which make the apparatus ideal for the average user.

The foregoing description of the invention is intended to be illustrative rather than limiting. The true scope of the invention should be determined only by construing the claims which follow.

I claim:

1. Apparatus for use with an intermittently operable picture projector and an audio tape machine to record picture change signals on a tape and to operate the projector in response to occurrence of said signals during playback of the tape, said apparatus comprising:
   output circuit means to which an input of a tape recorder may be coupled to enable recording change signals on a tape, said output circuit means including a manually operable switch,
   input circuit means to which an output of said tape recorder may be coupled to enable receiving said change signals along with audio signals recorded on said tape,
   a decoder device comprising a voltage controlled oscillator having output means coupled to said output circuit means, said oscillator being for producing pulse change signals at a predetermined frequency, said device also having input means coupled with said input circuit means for receiving said change signal pulses, and phase sensitive means coupled therewith, and operative to compare the phase relationship of signals from said voltage controlled oscillator and said change signals from said tape, and semiconductor switch means which change state in response to said phase sensitive means sensing that said signals from said oscillator and said change signals are substantially in phase, and
   means responsive to a change of state by said semiconductor switch means by controlling said projector to change a picture.

2. The apparatus as in claim 1 wherein said input circuit means include:
   input terminal means for said coupling to said tape recorder output means, and
   operational amplifier means having input means coupled to said terminal means and output means coupled to said input means of said decoder device, said operational amplifier being constructed and arranged for passing said pulse change signals and rejecting audio signals.

3. The apparatus as in claim 2 including a speaker connected to said input terminal means to enable hearing the audio signals recorded on said tape.

4. The apparatus as in claim 1 wherein said change signals are pulses of low microsecond duration at a frequency of about 2000 Hz.

5. The apparatus as in claim 1 wherein said change signals comprise pulses having a duration of about 2 microseconds each and a frequency of about 2000 Hz.

6. The apparatus as in claim 1 including an electric light source for providing a visual indication of said change signals being delivered over said output circuit means, and
   an operational amplifier constructed and arranged for having a high slew rate and having input means coupled with said output circuit means for receiving said change signals concurrently with operation of said manually operable switch, and having output means connected to said light source for energizing it in response to receiving change signals from said oscillator.

7. The apparatus as in claim 6 wherein said light source is a light emitting diode.

8. The apparatus as in claim 1 wherein said means which are responsive to a change of state by said semiconductor switch means include an electric light source, an electromagnetic coil and a d-c supply terminal in series with each other and with said semiconductor switch means.

9. The apparatus as in claim 8 wherein said light source is a light emitting diode.

10. The apparatus as in claim 8 including a magnetically operable reed switch operable by said relay coil for controlling the picture change means of the projector.

11. Apparatus for use with an intermittently operable picture projector and an audio tape machine to record picture change signals on a tape and to operate the projector in response to occurrence of said signals during playback of the tape, said apparatus comprising:
- a decoder device comprising input and outpt means, a voltage controlled oscillator for producing pulse change signals at a predetermined frequency, phase sensitive means and semiconductor switch means,
- a first circuit including a switch which is manually operable to couple said change signals from said oscillator to the input of said tape machine to enable recording of said signals on an audio tape,
- a second circuit including an operational amplifier having input and outpt means, said output means being coupled with the input means of said decoder device and said input means being for receiving composite change signals and audio signals from said tape machine during playback of said tape, said operational amplifier being constructed and arranged for passing said pulsed change signals and rejecting said audio signals,
- said phase sensitive means being operative to compare the phase relationship of said change signal pulses from said voltage controlled oscillator and said change signal pulses from said tape and responding to recorded change signals being substantially in phase with the pulse signals from said oscillator by controlling said semiconductor switch means to change state, and
- means responsive to a change of state by said semiconductor switch means by controlling said projector to change the picture.

12. The apparatus as in claim 11 including:
- an electroresponsive speaker coupled to said second circuit ahead of said input means of said amplifier for receiving the audio signals from said tape machine.

13. The apparatus as in claim 11 including:
- a second operational amplifier having input means connected to said first circuit to receive signals which pass from said output means of said decoder device through said manually operable switch and said second amplifier having output means, and
- an electric light source coupled to the output means of said second operational amplifier for being energized in response to said amplifier receiving transfer signals to thereby provide visual indication of transfer signals being recorded.

* * * * *